US005422056A

United States Patent [19]

Neu

[11] Patent Number: 5,422,056

[45] Date of Patent: Jun. 6, 1995

[54] METHOD OF MANUFACTURING GLASS REINFORCED CONCRETE BUILDING PRODUCTS

[75] Inventor: Steven B. Neu, 74 O'Gradys Road, Carrum, Downs Victoria 3201, Australia

[73] Assignee: Steven Bernd Neu, Melbourne, Australia

[21] Appl. No.: 835,943

[22] PCT Filed: Sep. 3, 1990

[86] PCT No.: PCT/AU90/00394

§ 371 Date: Feb. 18, 1992

§ 102(e) Date: Feb. 18, 1992

[87] PCT Pub. No.: WO91/03360

PCT Pub. Date: Mar. 21, 1991

[30] Foreign Application Priority Data

Sep. 4, 1989 [AU] Australia .............................. PJ6123

[51] Int. Cl.$^6$ .............................................. B29C 41/20

[52] U.S. Cl. .................................... 264/257; 264/219; 264/241; 264/250; 264/252; 264/255; 264/261; 264/267; 264/275

[58] Field of Search .................... 428/34.1; 264/209.1, 264/212, 214, 219, 228, 241, 250, 252, 255, 257, 261, 267, 275

[56] References Cited

U.S. PATENT DOCUMENTS 2,892,339 6/1959 Flower et al. .
3,324,967 6/1967 Robinson .

FOREIGN PATENT DOCUMENTS

5659/22 8/1922 Australia .
62110/73 5/1975 Australia .
78203/75 8/1976 Australia .
20699/76 6/1978 Australia .
39881/85 9/1985 Australia .
47048/85 3/1986 Australia .
043261 1/1982 European Pat. Off. .
214524 3/1987 European Pat. Off. .
1101243 10/1955 France .
2324429 4/1977 France .
82614 7/1940 New Zealand .
95822 8/1949 New Zealand .
149955 10/1968 New Zealand .
994306 6/1965 United Kingdom .
1458421 12/1976 United Kingdom .
2118892 11/1983 United Kingdom .

OTHER PUBLICATIONS

An article "Highway Engineering in Australia" in Nov. 1988 by Gernot Schubert (Exhibit A).

*Primary Examiner*—Patrick J. Ryan
*Assistant Examiner*—Richard Weisberger
*Attorney, Agent, or Firm*—Merchant, Gould, Smith, Edell, Welter & Schmidt

[57] ABSTRACT

Reinforced concrete building products are manufactured using a two-part mould (2, 3), the two parts being hinged together about an axis (4) which is adjacent an edge of each part-mould (2, 3). Glass-reinforced concrete is applied to each part-mould (2, 3), then allowed to partly dry before the part-moulds (2, 3) are folded together to produce a finished product.

6 Claims, 3 Drawing Sheets

METHOD OF MANUFACTURING GLASS REINFORCED CONCRETE BUILDING PRODUCTS

This invention relates to a method of manufacturing glass reinforced concrete building products. It relates particularly but not exclusively to a method of manufacturing glass reinforced concrete panels suitable for use as acoustic barriers.

Glass reinforced concrete has been used for several years as a building material in such applications as partitioning, linings, fascias, facades, cladding, curtain walling, spandrels, fencing and other similar such applications. Glass reinforced concrete (hereinafter referred to as "GRC") is made from a combination of Portland cement and silica sand reinforced with glass fibre (usually alkaline resistant glass strands).

GRC is known to be good acoustic barrier material because of its ability to reduce sound transmission. For example, a typical 10 mm thickness of GRC has a sound transmission loss of about 30 dB. GRC is particularly suitable for sound damping applications adjacent highways and motorways, but its use has not been fully exploited because the glass fibres in GRC are sharp, GRC tends to be rough, and adequate methods of manufacturing using GRC have not been developed.

In the particular application of roadside noise damping, it has been discovered that effective results are achieved if a wall comprised of GRC panels is placed beside the road. Each of the panels is constructed in such a way that the panel has reflective, dispersive or absorptive characteristics, or a combination of these. It is desirable that the panels in the wall be arranged contiguously.

The acoustic properties of individual GRC panels will depend to some extent upon the construction of those panels. Thus, while a suitable panel may be comprised of two or more pieces screwed or glued together, it is more desirable that a panel be formed in a single moulding operation. This is because joints have an inherently deleterious effect on the acoustic properties of a panel, and the securing together of GRC sheets is a labour intensive task.

It is a known technique for cast-moulding to use a two-part mould wherein, after the object in the mould has hardened, the parts of the mould are separated and the object can be removed. However, such a moulding technique is generally suitable only for solid or substantially solid objects. The present invention develops the known cast-moulding technique to create a new method of cast-moulding substantially hollow objects.

It is an object of this invention to provide a method of manufacturing GRC panels. Another object of this invention is to provide a method of manufacturing GRC panels in such a way that the GRC panels are suitable for contiguous installation. A further object of this invention is to provide a method of manufacturing a single piece GRC panel.

According to one aspect of the present invention, there is provided a method of manufacturing a glass reinforced concrete building product, comprising:

(a) providing a two-part mould, wherein the two parts are hinged together about an axis which is adjacent an edge of each of the two parts of the mould;

(b) covering both parts of the mould including the hinge with at least one layer of glass reinforced concrete;

(c) folding the two parts of the mould together; and (d) leaving the mould for a period of time to allow the glass reinforced concrete to harden, forming a single building product.

As a preferred feature, step (b) includes the placing of one or more additional mould elements at or near one or more edges of one or both parts of the mould, in order to cause one or more edge portions of the finished building product to have a particular shape. It is preferred that the edge-shaping be accomplished by use of this technique rather than by shaping after the GRC has hardened because it is difficult to modify the shape of hardened GRC, and such modifications tend to lead to weakness in the finished products.

According to another aspect of the present invention, there is provided a two-part mould wherein the two parts are hinged together about an axis which is adjacent an edge of each of the two parts of the mould. This mould is suitable for use in the method previously described.

According to a further aspect of the invention, there is provided a hollow GRC panel made according to the method previously described. The preferred panel has four edges, with channels extending along three edges and a ridge extending along the fourth.

The preferred ratio of sand to cement for usage in creating GRC panels is from 1:1 to 1:2, with the most preferred ratio being 1:2. The preferred working range ratio for water to cement is 0.32 to 0.38, with the most preferred value being 0.35.

The preferred percentage of glass fibre present in the component mix is from 2.5 to 6.3. The most preferred range is 5.0 to 5.3%.

The preferred glass fibre length range is from 10 to 50 mm. The most preferred range is 35 to 38 mm.

Example embodiments of the method of the present invention are illustrated in the attached drawings.

Figure 1:
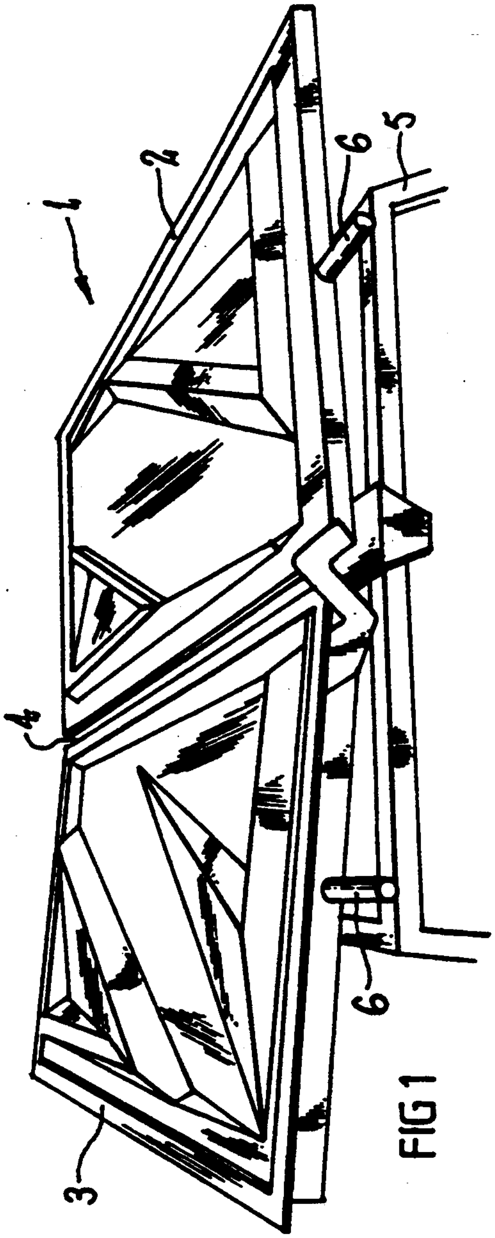
FIG. 1 shows a foldable mould in its laid flat position.

FIGS. 1 to 4 illustrate steps in the construction of a dispersive GRC panel using a foldable mould. A foldable mould, designated generally as 1, comprises two half moulds 2 and 3. The two half moulds 2 and 3 are connected at hinged connection 4. Foldable mould 1 is supported in a laid flat position on trestle table 5 by means of supporting pins 6.

Foldable mould 1 is preferably cleaned by scraping away excess GRC from previous moulding operations and blowing air over the mould to eliminate dust. The mould is preferably also oiled in preparation for the moulding operation.

The preferred method comprises applying a mist coat of cement over the entire mould, followed by the application of one coat of GRC over the entire mould, including the area about hinged connection 4. The GRC is then rolled by means of a hand-held roller and surplus GRC around the edges of the mould is folded back into the mould with a trowel.

Figure 2:
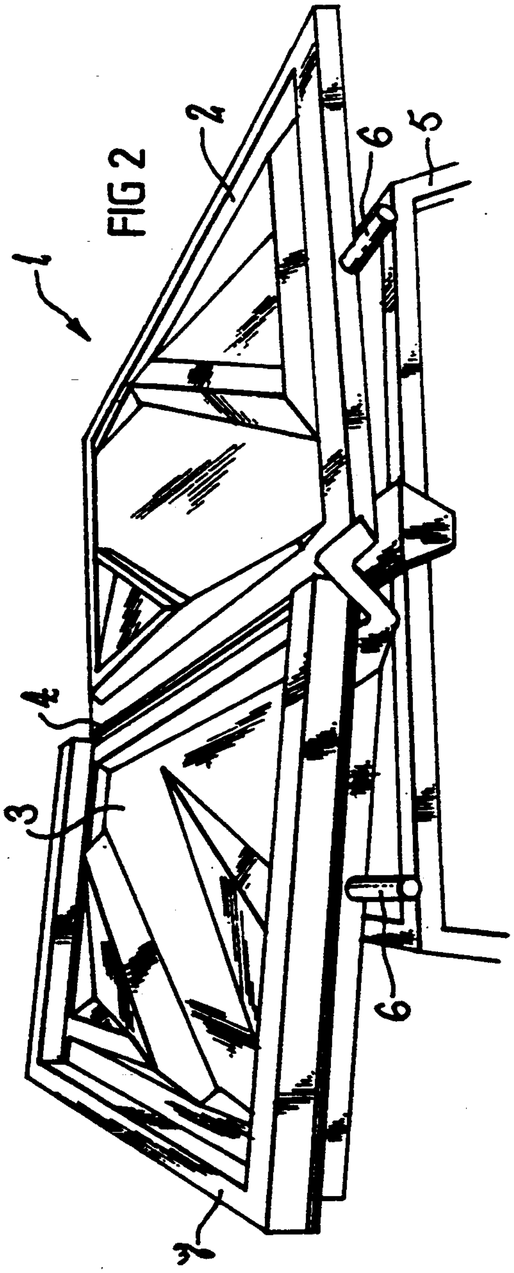
FIG. 2 shows the same foldable mould with channel formers attached.

Channel formers 7 are placed around the edges of one of the half moulds 3 as illustrated in FIG. 2. A mist coat of cement is applied to the channel formers, followed by a second coat of GRC which is applied around the base, sides and top of the channel formers. A substantial slurry coat is applied around the edges of the mould and the mould is allowed to sit for 5 to 10 minutes in order to allow the GRC to stiffen.

The stiffening process may be assisted in between the application of different layers or after the final layer by the use of a concrete-hardening acceleration agent, such as the one sold by Cementaids (International) Pty Ltd under the trade name RAPIDARD.

Figure 3:
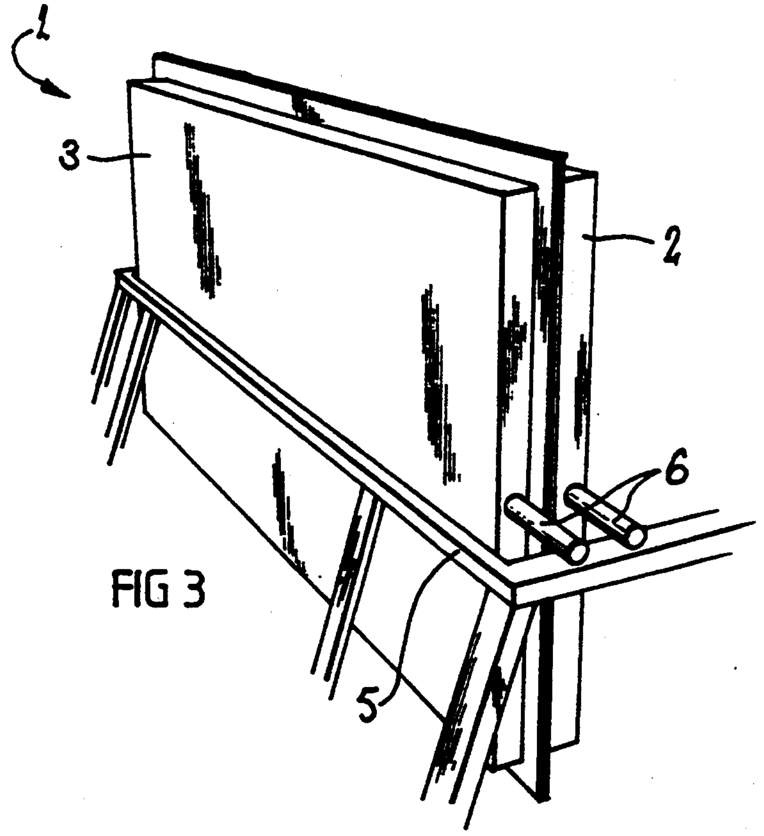
FIG. 3 shows the foldable mould in its folded state.

The two half moulds are then folded together about hinged connection 4 so that the GRC inside one half-mould contacts the GRC inside the other half-mould around the edges of the mould and the GRC inside the mould forms a hollow box or panel shape. Further GRC or cement may be applied as the two half-moulds are brought together. The mould is then clamped in a closed position, as illustrated in FIG. 3.

This method, which results in the formation of a hollow, single-piece GRC panel having four edges, ensures that the panel has a reasonable resistance to shear forces because one of the edges (namely the edge nearest hinged connection 4) is fully reinforced by glass fibres.

The mould is held closed for approximately 12 hours, after which time the GRC will have set sufficiently to allow for removal from the mould. Protrusions may then be removed, and indentations may be patched as required. Completed panels are preferably cured for a period such as seven days.

Figure 4:
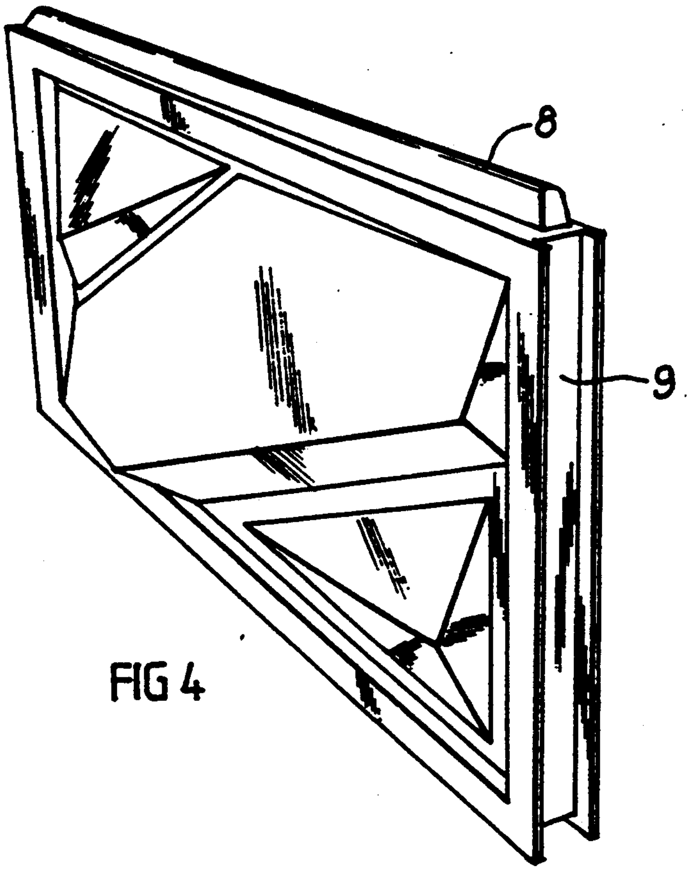
FIG. 4 shows a dispersive GRC panel constructed using the foldable mould of FIG. 1.

FIG. 4 illustrates a completed dispersive GRC panel which in this case has a ridge 8 on its top side and channels 9 on its other sides.

Figure 5:
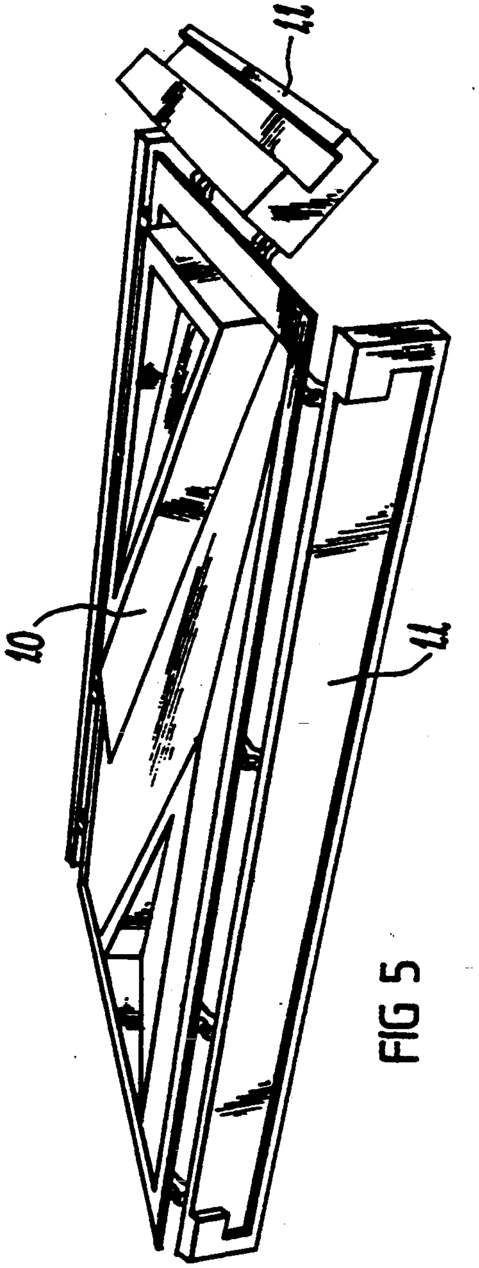
FIG. 5 shows a half-mould with hingedly attached channel formers.

FIG. 5 illustrates a half-mould 10 which has hingedly attached channel formers 11. This half-mould is suitable for use in the method previously described.

According to an alternative embodiment using the half-mould 10 of FIG. 5, a mist coating of cement is first applied to the mould, followed by three coatings of GRC at 5% glass. A hand-held roller is used to consolidate the GRC after each coating.

Channel formers 11 are then rotated into position around their hinged connections and a mist coating of cement is applied to all the areas that have not yet been sprayed, with extra amounts of cement concentrated towards the corners.

Three further coatings of GRC are then applied, so that the GRC has an average thickness of about 10 mm. The method then proceeds in the same manner as the previously described embodiment.

The use of channel formers in the method of the present invention results in the creation of GRC panels with channels along up to 3 edges and, preferably, a ridge along the fourth edge. Panels having such a shape are particularly advantageous as they allow for easy and aesthetic installation on site.

The preferred technique for installing a panel in a noise-deflecting or absorbing application involves installing vertical posts one panel-width apart, then sliding the panel down over the posts, with the panel's ridge edge upwards and the two side edge channels each accommodating half of a vertical post. The top ridge edge of the panel fits into the bottom channel edge of the panel above. The other half of each vertical post is accommodated in a side edge channel of an adjacent panel. It is thus possible to form a substantial sound barrier of contiguous panels, providing an effective acoustic seal.

It is to be understood that various alterations, modifications and/or additions may be introduced into the constructions and arrangements of parts previously described without departing from the spirit and ambit of the invention.

As will be seen from the foregoing, the present invention provides improvements in the usage of GRC in the construction of concrete panels. In particular, it provides a method for producing a GRC panel which is hollow and substantially smooth, as well as having resistance to shear forces.

I claim:

1. A method of manufacturing a glass reinforced concrete building product, comprising:

(a) providing a two-part mould, wherein the two parts are hinged together about an axis which is on an edge of each of the two parts of the mould by a hinge;

(b) covering both parts of the mould including the hinge with at least one layer of glass reinforced concrete, the glass reinforced concrete being applied across the hinge from one part of the mould to the other;

(c) folding the two parts of the mould together; and (d) leaving the mould for a period of time to allow the glass reinforced concrete to harden, forming a single building product.

2. A method according to claim 1, wherein step (b) further includes a step of applying cement which does not contain glass and a concrete-hardening acceleration agent.

3. A method according to claim 1, wherein at least one additional mould element is placed proximate to at least one edge of at least one said part of the mould during step (b), in order to cause at least one edge portion of a finished building product to have a particular shape.

4. A method according to claim 3, wherein the additional mould element is attached to the mould by at least one hinge.

5. A method according to claim 3, wherein the additional mould element causes the finished building product to have a channel along at least one edge.

6. A method according to claim 5, wherein the finished building product has four edges, the additional mould element causes the building product to have channels along three of the edges, and a shape of the mould in an area of the hinge causes a ridge along the fourth edge.

* * * * *

UNITED STATES PATENT AND TRADEMARK OFFICE

CERTIFICATE OF CORRECTION

PATENT NO. : 5,422,056

DATED : JUNE 6, 1995

INVENTOR(S) : NEU

It is certified that error appears in the above-identified patent and that said Letters Patent is hereby corrected as shown below:

ON THE TITLE PAGE:

Item [73] Assignee: "Steven Bernd Neu" should read --ACI Australia Limited--

Signed and Sealed this

First Day of December, 1998

Attest:

BRUCE LEHMAN

*Attesting Officer* *Commissioner of Patents and Trademarks*